Aug. 27, 1946. W. M. KELLOGG 2,406,382
INDICATING SYSTEM
Filed Sept. 24, 1941 — 3 Sheets-Sheet 1

INVENTOR
W. M. KELLOGG
BY
Earl C. Laughlin
ATTORNEY

Aug. 27, 1946.   W. M. KELLOGG   2,406,382
INDICATING SYSTEM
Filed Sept. 24, 1941   3 Sheets-Sheet 3
FIG. 3
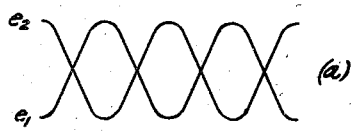
(a)
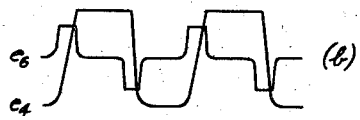
(b)
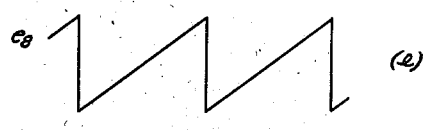
(e)
(c)
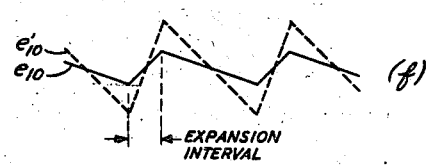
(f)
EXPANSION INTERVAL
(d)
(g)
INVENTOR
W. M. KELLOGG
BY
Earl C. Laughlin
ATTORNEY Patented Aug. 27, 1946

2,406,382

UNITED STATES PATENT OFFICE 2,406,382

INDICATING SYSTEM

William M. Kellogg, Morristown, N. J., assignor to Bell Telephone Laboratories, Incorporated, New York, N. Y., a corporation of New York Application September 24, 1941, Serial No. 412,099

1 Claim. (Cl. 315—24)

This invention relates to an indicating system and particularly to an indicating system employing a cathode ray tube.

It is well known in the art to employ a cathode ray tube as a timing device to indicate the time intervals between a particular sequence of signals. In such systems, the cathode ray beam generated in the tube is deflected by means of a varying voltage applied to one set of deflection elements so that it sweeps at a known rate over a predetermined path on a screen or target to provide a linear time scale or axis and the signals are applied to another set of deflection elements in such manner as to cause transverse deflections of the beam from its normal path. The disposition of the latter deflections along the normal path as displayed on the screen indicates the time intervals existing between the signals.

In order that individual signals or restricted portions of the time scale of the cathode ray tube indicator tube may be closely observed, it is necessary in general to expand the scale beyond the available range of the screen. As a result of such sweep expansion, much of the total sweep range would be lost from view.

An object of the invention is to expand a portion of the timing scale of an indicating circuit employing a cathode ray indicator tube. A more specific object is to magnify or enlarge any desired restricted portion of the signal pattern as viewed on the screen of a cathode ray indicator tube while maintaining the total sweep range of the cathode ray beam within the field of view of the screen, thus obtaining an effect analogous to that obtained by applying an optical lens to a limited segment of the scale of a slide rule.

These objects are attained in accordance with one modification of the invention by applying the combined output of two synchronized sweep (sawtooth) wave generators to the sweep deflection elements of a cathode ray oscilloscope, one of which is the usual linear full scale generator which drives the cathode ray beam from left to right across the screen, and the other having a left-to-right component of only short duration as compared with the first generator. The restricted expansion or lens effect on the horizontal scale is obtained during the interval of additive effect of the two generators. The particular portion of the sweep pattern to which this lens effect is applied may be controlled by suitably adjusting the relative phase of the two sweep generators, this control being analogous to that obtained by moving an optical lens along the scale of a slide rule.

The various features and objects of the invention will be better understood from the following detailed description when read in conjunction with the accompanying drawings in which.

Figure 1:
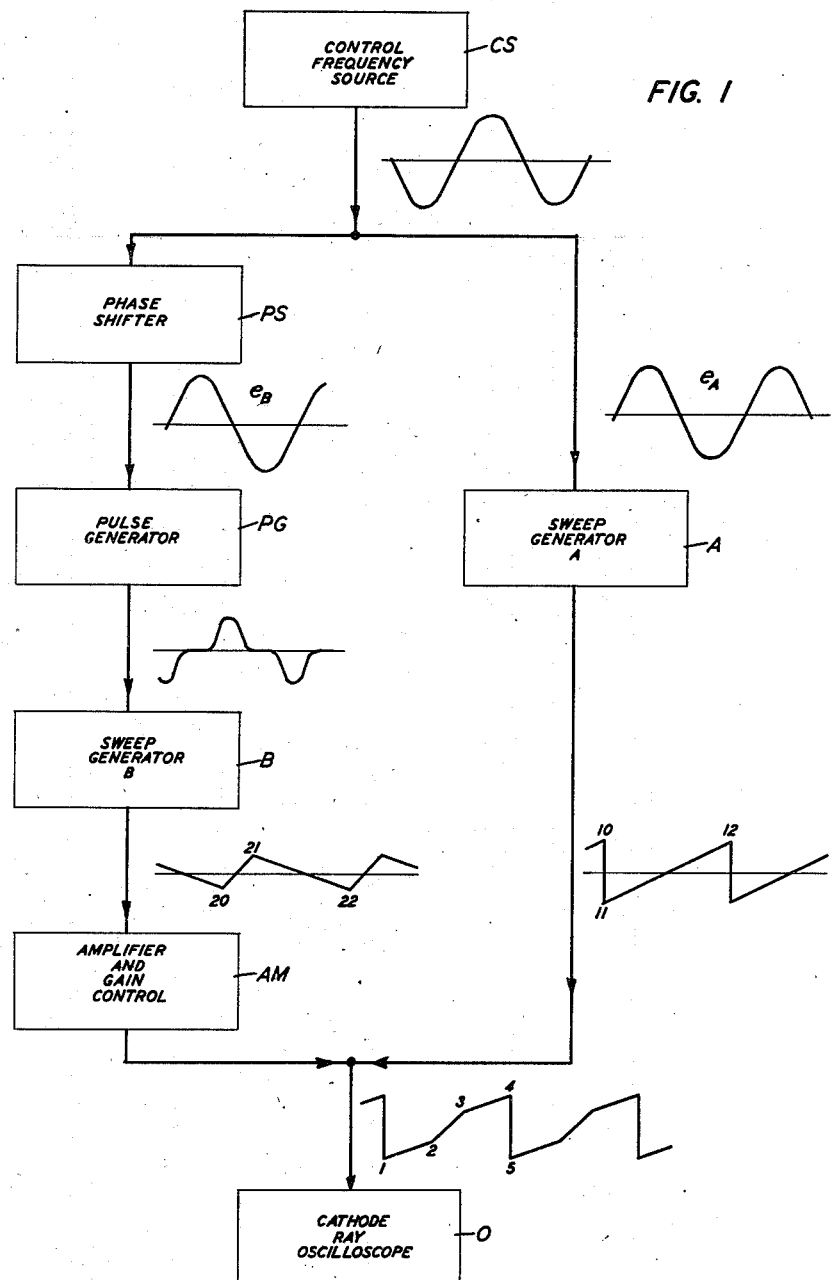
Fig. 1 shows a block diagram of one system in accordance with the invention.

In the arrangement of Fig. 1, the conventional sweep generator A produces a saw-tooth voltage output wave, such as indicated on the figure by the curve just below generator A, when it is excited by the sinusoidal voltage $e_A$ of given frequency applied to its input from the output of the control wave source CS. The saw-tooth voltage output of generator A is applied to the input (sweep deflection elements) of the cathode ray oscilloscope O. If this sweep alone is applied to the oscilloscope O, the cathode ray beam produced by the latter would progress uniformly from left to right across the oscilloscope screen during the time interval 11 to 12 at a rate established by the shape of the line 11—12 in the applied saw-tooth wave. In order to increase this rate by the usual method, it would be necessary to increase the amplitude 10—11, and as a result, the amplitude of the sweep would be carried beyond the capacity of the oscilloscope screen to reproduce it.

In accordance with the invention, an increase in the rate of the sweep over a portion of its range without changing the total sweep range is obtained by applying to the input (sweep deflection elements) of the oscilloscope O, the output of an auxiliary sweep generator B, synchronized with the first generator, producing a saw-tooth wave of a particular characteristic. As indicated by the curve below the generator B, the latter saw-tooth wave may have a positive slope from 20 to 21 and a negative slope from 21 to 22, the positive slope from 20 to 21 being steeper than that from 11 to 12 in the output wave of generator A. The output wave of the sweep generator B is transmitted through a suitable amplifier AM with an associated gain control for adjusting the amount of expansion, before applying it to the oscilloscope sweep deflection elements. The combination of the output waves of the two generators which are applied to the oscilloscope O is shown by the lower curve of Fig. 1, the chosen phase relationship between the two sweep generators being such as to provide a 180 degrees phase difference. Thus, it will be observed that the positive interval 1 to 4 in the combination wave is composed of intervals 1—2 and 3—4 of less slope than the 11—12 slope of the positive interval of the output wave of generator A and 2—3 of greater slope than 11—12. The result is that the interval 2—3 is expanded and signals occurring during this time interval occupy a magnified portion of the sweep trace of oscilloscope O. The remaining intervals 1—2 and 3—4 are compressed to the extent that 2—3 is expanded so that the full scale deflection of the sweep remains constant.

The time interval 20—21 of the expansion provided by sweep generator 13 is controlled by the shape of the distorted voltage operating pulse produced by the pulse generator PG from the sinusoidal voltage wave $e_B$ applied from the source CS to the input of the latter through the phase shifter PS. By suitable design of pulse generator PG, the expansion interval may be made large, or it may be made small so that a very short time interval is made to cover the full scale of the oscilloscope O. The phase shifter PS is provided for those applications in which it is required to shift the expansion interval along the entire sweep interval.

Figure 2:
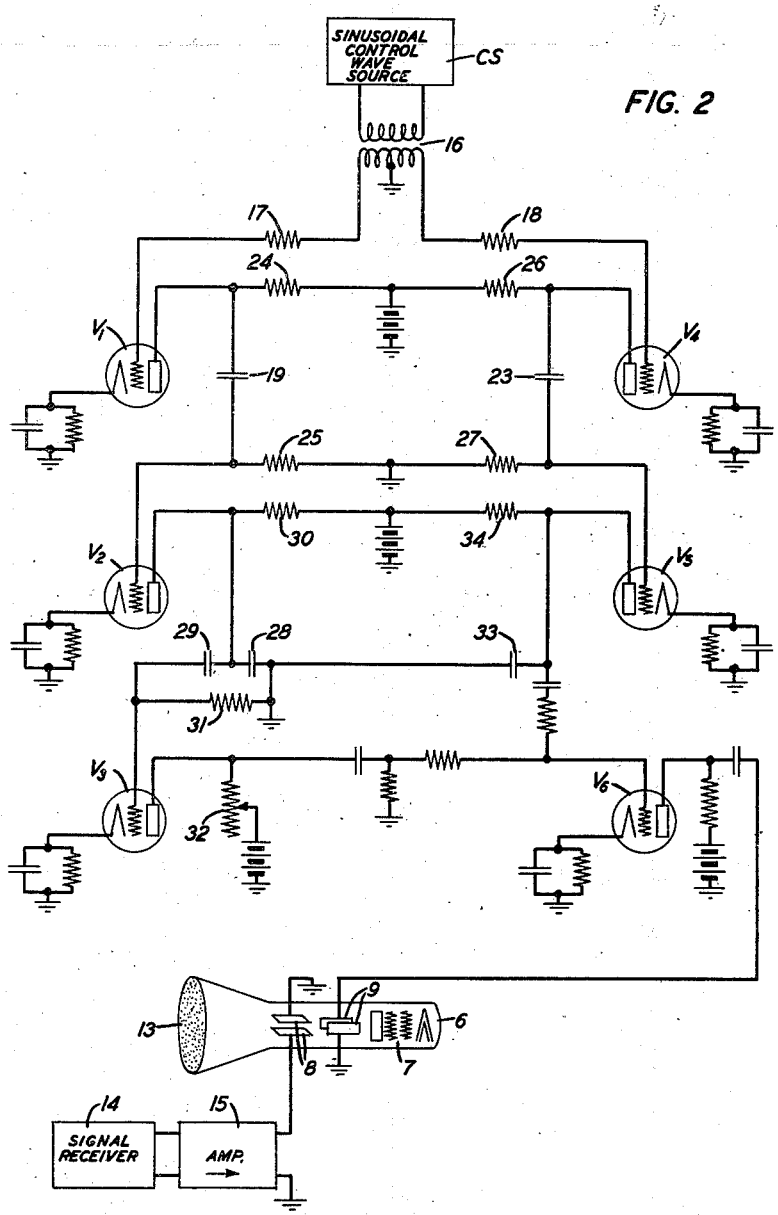
Fig. 2 shows schematically a more detailed arrangement of a system embodying the invention; and, Fig. 3 shows curves which illustrate the individual and combined performance of the component elements of the system of Fig. 2.

Fig. 2 shows in more detail circuits which may be used to provide the restricted sweep expansion in accordance with the invention. In the system of Fig. 2, the oscilloscope comprises a cathode ray tube 6 in which are disposed the usual cathode ray beam producing and control apparatus 7, a pair of vertical deflection plates 8, a pair of horizontal deflection plates 9 and a fluorescent screen 13. The output of a receiver 14 for detecting the signals to be displayed on the screen of the oscilloscope is connected through the signal amplifier 15 across the vertical deflection plates 8, causing the vertical deflections of the cathode ray beam proportional to the varying potentials of the received signals, along the timing base line formed by the horizontal sweep of the beam across the screen under control of the sweep voltage applied to the horizontal deflection plates 9.

In the arrangement of Fig. 2, the resistance-capacity coupled three-electrode vacuum tubes $V_1$, $V_2$ and $V_3$ corresponding in function to the pulse generator PG, the sweep generator B and the amplifier AM with its associated gain control, respectively, in the system of Fig. 1, are employed to produce the auxiliary sweep B of the cathode ray beam for expansion, and the resistance-capacity coupled three-electrode vacuum tubes $V_4$ and $V_5$, corresponding in combined function to the sweep generator A in the system of Fig. 1, are employed to produce the main full scale sweep A of the beam. With this arrangement, the expansion interval is placed at mid-scale of the main sweep by operating the tubes $V_1$ and $V_4$ at 180 degree phase relationship by connecting them in push-pull with respect to the applied constant frequency sinusoidal control wave from source CS, and the phase shifter PS of the system Fig. 1 is omitted.

The operation of the system of Fig. 2 will be explained by reference to the curves of Fig. 3. Fig. 3 (a) shows the sinusoidal constant frequency voltages $e_1$ and $e_2$ with 180 degrees phase difference between them respectively applied to the control grid-cathode circuits of the tubes $V_1$ and $V_4$ from the control wave source CS through input transformer 16. Because of the large series resistances 17, 18 in the control grid-cathode circuit of tubes $V_1$ and $V_4$, respectively, these tubes are over-driven by the large grid signal inputs $e_1$ and $e_2$, respectively, so that the signals in the plate-cathode circuits of these tubes approximate wave signals, as shown by $e_4$ of Fig. 3 (b) and $e_3$ of Fig. 3 (c), respectively.

The coupling condenser 19 between the plate of tube $V_1$ and the control grid of tube $V_2$, and the coupling condenser 23 between the plate of tube $V_4$ and the control grid of tube $V_5$ are controlling impedances as compared with the associated grid coupling resistances 24, 25 and 26, 27, respectively, and therefore cause the grid signal voltages $e_5$ and $e_6$ applied to tubes $V_2$ and $V_5$, to be the differentials of the plate signal voltages $e_3$ and $e_4$ of tubes $V_1$ and $V_4$, respectively. The former signal voltages, therefore, have pulse characteristics. The voltages $e_5$ and $e_6$ are shown in Fig. 3 (c) and Fig. 3 (b), respectively. The voltage $e_6$ is required only to fire the sweep generator $V_5$ with precision. The voltage $e_5$ applied to the control grid of tube $V_2$ controls the interval of sweep expansion. The pulse characteristics of $e_5$ are determined by the amplitude of the control grid voltage driving tube $V_1$. The greater this pulse duration, the longer the interval of sweep expansion. The tube $V_2$ is biased below cut-off so that only the positive pulse intervals of the applied voltage $e_5$ will affect the plate current of $V_2$. This results in the discharge of condenser 28 during the positive grid intervals and its recharge through resistance 30 during the intervals between positive grid pulses. The resulting saw-tooth voltage developed across resistance 30 is shown as $e_7$ in Fig. 3 (d). The tube $V_3$ amplifies the portion of this voltage appearing in resistance 31 connected across condensers 28 and 29. The output of $V_3$ and hence the degree of mid-scale expansion may be controlled by adjustment of the variable resistance 32 in the plate-cathode circuit of that tube. The output voltage of tube $V_3$ is shown as $e_{10}$ in Fig. 3 (f).

Similarly, the tube $V_5$ will operate in response to the pulse wave $e_6$ applied to its control grid to cause the discharge of condenser 33 during the positive grid intervals and to recharge that condenser slowly through resistance 34 between pulses. The resulting saw-tooth voltage is shown as $e_8$ in Fig. 3 (e).

The saw-tooth voltage output $e_{10}$ developed by tube $V_5$ and the expansion sweep voltage $e_8$ produced by tube $V_3$ are combined in the control grid-cathode circuit of sweep amplifier tube $V_6$ to form voltage $e_{11}$ as shown in Fig. 3 (g), which is amplified by amplifier $V_6$ and applied across the horizontal deflection plates 9 of the cathode ray tube 6. The expansion interval occurs at mid-scale of the sweep voltage. As noted above, it is under control of the variable coupling resistance 32 in the plate circuit of tube $V_3$. The dotted curves $e_{10'}$ in Fig. 3 (f) and $e_{11'}$ in Fig. 3 (g) show the effect of increasing this resistance so that the expanded segment occupies the full scale of the oscilloscope. The lower the setting of resistance 32, the more nearly the sweep voltage approaches a conventional saw-tooth sweep which will cause the cathode ray beam in tube 6 to move at a uniform rate from left to right over the screen 13. As the amount of injected expansion is increased the faster the beam travels at mid-scale and the slower at the other portions of the screen. The effect of the combination is a center expansion and a corresponding end compression of the oscilloscope signal pattern. The whole signal pattern is thus kept in view as the center is expanded for close observation of part of the pattern. It is thus possible to monitor the full sweep range, even though, say 5 per cent of the scale is expanded to occupy 50 per cent of the full deflection. By the use of a suitable phase shifter, such as shown in the alternative arrangement of Fig. 1 to provide various adjustments of the phase relations of the main sweep generator and the auxiliary sweep generator, the expansion may be applied to any desired portion of the sweep pattern.

Various other modifications of the circuits illustrated and described which are within the spirit and scope of the invention will be apparent to persons skilled in the art.

What is claimed is:

In combination with a cathode ray tube signal indicator including cathode ray beam producing and deflecting means and an indicating screen, two saw-tooth wave generators for controlling said deflecting means to sweep the cathode ray beam back and forth across said screen to provide a time scale thereon, one of said generators producing a saw-tooth wave, the rising portions of which are of relatively short duration compared with those produced by the other generator, such that the combined action of both generators on said deflecting means results in an expansion of a portion of said time scale and a corresponding compression of the remaining portion so as to maintain the total sweep range within the field of view of said screen and means for controlling the relative phase of the outputs of said generators to select the portion of the scale to be amplified, said one generator comprising an amplifier having a plurality of resistance-condenser coupled vacuum tube stages, the second stage of which is biased below cut-off, means to apply a sinusoidal voltage input to said amplifier of sufficient amplitude to overload the first stage thereby producing a square-shaped voltage output for that stage, the resistance-condenser coupling between the first two amplifier stages being proportioned so that the voltage input to the biased second stage is the differential of the voltage output of said first stage, thus producing a pulse output for said second stage which is unaffected by the positive portions of the input voltage thereto, the condenser in the output coupling of said second stage discharging during the positive input intervals and recharging through the resistance thereof during the intervals between positive inputs, the gain of said amplifier being adjusted to provide the desired degree of scale expansion and the amplitude of the sinusoidal voltage input thereto being selected to control the pulse duration of the amplifier output applied to said deflecting means and thus the interval of scale expansion.

WILLIAM M. KELLOGG.